(12) United States Patent
Olsson (10) Patent No.: US 12,345,516 B2
(45) Date of Patent: Jul. 1, 2025

(54) LOCKING ARRANGEMENT FOR A DESTRUCTION SYSTEM

(71) Applicant: DYNASAFE DEMIL SYSTEMS AB, Karlskoga (SE)

(72) Inventor: Fredrik Olsson, Torslanda (SE)

(73) Assignee: DYNASAFE DEMIL SYSTEMS AB, Karlskoga (SE)

(*) Notice: Subject to any disclaimer, the term of this patent is extended or adjusted under 35 U.S.C. 154(b) by 0 days.

(21) Appl. No.: 18/285,679

(22) PCT Filed: Mar. 17, 2022

(86) PCT No.: PCT/EP2022/057076
§ 371 (c)(1),
(2) Date: Oct. 5, 2023

(87) PCT Pub. No.: WO2022/218642
PCT Pub. Date: Oct. 20, 2022

(65) Prior Publication Data
US 2024/0200654 A1    Jun. 20, 2024

(30) Foreign Application Priority Data

Apr. 12, 2021  (EP) .................................. 21167890

(51) Int. Cl.
*F42D 5/04*    (2006.01)
*F16J 13/06*    (2006.01)

(52) U.S. Cl.
CPC ................ *F42D 5/04* (2013.01); *F16J 13/06* (2013.01)

(58) Field of Classification Search
CPC .. F42D 5/04; F42D 5/045; F42B 39/00; F42B 39/14; F42B 39/20; F42B 39/24; F42B 39/26; F16J 13/06
See application file for complete search history.

(56) References Cited

U.S. PATENT DOCUMENTS

| 1,362,878 | A |   | 12/1920 | Ladd |
| 1,563,865 | A |   | 12/1925 | Vincent |
| 3,362,573 | A | * | 1/1968 | Wales, Jr. ................ F16J 13/06 220/326 |
| 4,157,146 | A | * | 6/1979 | Svenson ................... F16J 13/24 292/257 |
| 4,432,285 | A | * | 2/1984 | Boyars ................... B65F 1/1615 109/1 R |
| 4,850,505 | A | * | 7/1989 | Horvei ..................... F16J 13/06 220/319 |

(Continued)

FOREIGN PATENT DOCUMENTS

| EP | 1809929 A1 | 7/2007 |  |
| JP | 2006292260 A | * 10/2006 | ............ F42B 33/067 |

(Continued)

OTHER PUBLICATIONS

Extended European Search Report dated Oct. 1, 2021 for EP Application No. 21167890.9, 11 pages.

(Continued)

*Primary Examiner* — Benjamin P Lee
(74) *Attorney, Agent, or Firm* — RMCK Law Group, PLC (57) ABSTRACT

The present disclosure relates to a destruction system, and particularly to a locking arrangement arranged to improve an interconnection between a first and a second vessel portion of the destruction system.

16 Claims, 6 Drawing Sheets

(56) References Cited

U.S. PATENT DOCUMENTS

| | | | | |
|---|---|---|---|---|
| 4,871,278 | A * | 10/1989 | Gerlach | F16J 13/06 403/348 |
| 5,248,055 | A * | 9/1993 | Sanai | F42B 39/20 220/325 |
| 6,315,147 | B1 * | 11/2001 | Bachmeier | F17C 13/06 220/325 |
| 6,401,958 | B1 * | 6/2002 | Foss | F16J 13/06 220/320 |
| 6,595,247 | B1 * | 7/2003 | Landy | F42B 39/20 454/56 |
| 7,032,322 | B1 * | 4/2006 | Smith | B09B 3/0075 34/77 |
| 7,770,750 | B2 * | 8/2010 | Squalli | B01J 3/03 220/4.12 |
| 8,621,973 | B2 * | 1/2014 | Abbe | F42D 5/045 86/50 |
| 9,377,106 | B2 * | 6/2016 | Hartog | B01D 29/52 |
| 2004/0107823 | A1 * | 6/2004 | Kiley | F41H 5/013 86/50 |
| 2006/0090364 | A1 * | 5/2006 | Smith | B09B 3/0075 34/77 |
| 2013/0294862 | A1 * | 11/2013 | Manahan | E05C 19/00 411/166 |
| 2013/0340662 | A1 | 12/2013 | Shinkai et al. | |
| 2015/0076841 | A1 * | 3/2015 | Zhao | E05C 19/00 292/257 |
| 2019/0003812 | A1 * | 1/2019 | Heaton | A62D 3/40 |

FOREIGN PATENT DOCUMENTS

| | | | | |
|---|---|---|---|---|
| RU | 2614992 C1 | 4/2017 | | |
| WO | WO-9218960 A1 * | 10/1992 | | B64F 1/368 |
| WO | WO-0142688 A1 * | 6/2001 | | B65D 90/66 |

OTHER PUBLICATIONS

PCT International Search Report and Written Opinion dated Aug. 2, 2022 for International Application No. PCT/EP2022/057076, 21 pages.

* cited by examiner

LOCKING ARRANGEMENT FOR A DESTRUCTION SYSTEM

CROSS-REFERENCE TO RELATED APPLICATIONS

This application is a 371 U.S. National Stage of International Application No. PCT/EP2022/057076, filed Mar. 17, 2022, which claims priority to European Patent Application No. 21167890.9, filed Apr. 12, 2021. The disclosures of each of the above applications are incorporated herein by reference in their entirety.

TECHNICAL FIELD

The present disclosure relates to a destruction system, and particularly to a locking arrangement arranged to improve an interconnection between a first and a second vessel portion of the destruction system.

BACKGROUND

A destruction system may be used for destroying explosive objects such as e.g. ammunition, propellants or explosives, including for example old unusable or unwanted ammunition. Such a system must be robust in order to withstand the high loads of possible detonating explosives.

An example of such a destruction system adapted for handling detonation-dangerous material is disclosed in EP1809929 where munitions are loaded in a container by opening and closing a locking ring that is disposed between two parts forming the container. Loading of munitions into a destruction chamber of the destruction system is an important part of the destruction process and it is thus desirable to enable a user-friendly and safe way to do it. Even though the above-mentioned prior art shows very useful solutions for connecting/disconnecting the parts of the container, it would still be desirable to even further optimize such an arrangement, for example to be able to reduce an overall manufacturing cost.

Further attention is drawn to US20130340662, presenting a salvage container and a salvaging method capable of salvaging ammunition dumped into the sea using a simple configuration while more reliably suppressing the leakage of a chemical agent from the ammunition Additionally, in U.S. Pat. No. 1,563,865 there is shown a device for securing the closure plate of high pressure stills or the like in such a manner as to obviate the necessity of having to employ fastening bolts such as are commonly used.

SUMMARY

In view of the above-mentioned need, a general object of the present disclosure is to provide an improved a locking arrangement which at least to some extent provide further improvements in relation to prior art. In addition, it is also desirable to simplify the process of manufacturing and operating such a destruction system. It is desirable that the destruction system is detonation-proof, preferably gas-tight, and useful for destruction of detonation-dangerous material.

Thus, in according to a first aspect of the present disclosure there is provided a locking arrangement for a detonation-proof destruction system adapted for hazardous material destruction, wherein destruction system comprises a first vessel portion and a second vessel portion, the locking arrangement provided for interconnecting the first vessel portion to the second vessel portion when facing each other, wherein the locking arrangement comprises a plurality of elongated connection elements having a first end and a second end, wherein each of the plurality of elongated connection elements at the first end is provided with an engagement portion adapted to engage with a locking flange provided at a circumference of the first vessel portion, and at least one mechanical actuator arranged between the second vessel portion and the second end of the plurality of elongated connection elements, wherein the at least one mechanical actuator is adapted to exert a pressure between the second vessel portion and the second end of the plurality of elongated connection elements to clamp the first vessel portion to the second vessel portion.

In accordance to the present disclosure, the locking arrangement makes use of at least one mechanical actuator for forcing the vessel portions towards each other, to thereby form a preferably explosive resistant and closed vessel, where the closed vessel forms part of the overall destruction system. Specifically, the at least one mechanical actuator is provided to engage with one end of a plurality of elongated connection elements, where the plurality of elongated connection elements are at the other end is arranged to engage with a locking flange provided at a circumference of the first vessel portion. Accordingly, when the mechanical actuator is activated it may for example be possible to increase a length of the mechanical actuator, resulting in that the mechanical actuator "pushes" at one end of the elongated connection elements thereby "pulling" the first vessel portion towards the second vessel portion. Accordingly, the engagement portion of each of the elongated connection elements will function as a form of a "hook" adapted to engage with the locking flange provided at the circumference of the first vessel portion. Thus, the at least one mechanical actuator will exert a pressure to the opposite end of the elongated connection elements.

An advantage following the locking arrangement of the present disclosure is that the interconnection of the vessel portions can be made without the need for the prior art locking ring. The general use of a locking ring has shown highly reliable and has been positively accepted in the technical field of destruction systems. That said, to achieve the desired reliability, the locking ring has to be manufactured from a highly durable metal material to be able withstand a potential detonation within the closed vessel, thereby resulting in a destruction system that is complex as well as costly to manufacture, while also being less than easy to operate.

By means of replacing the locking ring with the present locking arrangement, it is possible to reduce the cost of manufacturing the overall destruction system, since the use of the plurality of elongated connection elements in combination with the at least one mechanical actuator allows for the possibility to use less costly materials due to the fact that the elongated connection elements can be positioned completely outside of the closed vessel.

The use of the elongated connection elements in combination with the locking flange provided at the circumference of the first vessel portion will also reduce the need to have a manufacturing accuracy being as high as what is needed when using the locking ring, thus saving cost in manufacturing (including machining and manual labor) as compared to the machined locking ring. A tight interconnection, as is achieved using the locking ring, may by means of the novel locking arrangement be achieved even with a somewhat even the distribution of the plurality of elongated connection elements are somewhat even around the circumference of the vessel portions. That is, when distribution of the plurality of elongated connection elements around the circumference of the vessel portions it is possible to achieve an even clamping force at an interconnection area provided along a circumference of the first and the second vessel portion where the first vessel portion is mating with the second vessel portion, for forming the closed vessel, thus ensuring that the risk of any leakage from within the closed vessel is reduced.

A further advantage with the solution according to the present disclosure relates to the inherent thermal expansion that is apparent when the destruction system is instead equipped with the prior art locking ring. Since the destruction system is subject to potential temperatures of up to 800 degrees C., the locking ring will within some temperature ranges "get stuck" to the vessel portion(s), meaning that it could be problematic to open the closed vessel. The solution according to the present disclosure rather applies the mentioned clamping force, thus not interacting with the vessel portions as when using the prior art locking ring.

Within the context of the present disclosure, it should be understood that when the first vessel portion is axially moved towards the second vessel portion and the closed vessel is formed, the closed vessel will function as an enclosed space for receiving the detonation-dangerous material to be destructed. At least one of the vessel portions must thus be formed as an "open vessel portion", thus having a curved inner surface. The other vessel portion may also be an open vessel portion but may also be formed as a "lid" to mate with the open vessel portion. It should further be understood that either (or both) of the first and the second vessel portion may be an open vessel portion. However, in the description provided below the first vessel portion is provided as an open vessel portion for receiving the detonation-dangerous material to be destructed. Furthermore, in a preferred embodiment, the first and the second open vessel portion is constructed from a sheet metal element having a thickness of at least 20 mm.

It may in accordance to the present disclosure be possible to further include a support structure that is movably arranged in relation to the second vessel, wherein each of the plurality of elongated connection elements at the second end are engaging with the support structure. The inclusion of the support structure may be used to further ensure that the that the clamping force can be evenly distributed at the interconnection area where the first vessel portion is mating with the second vessel portion. In accordance to the present disclosure, the at least one mechanical actuator will "push" at the support structure, where the support structure then pushes at the plurality of elongated connection elements.

In an embodiment of the present disclosure the at least one mechanical actuator comprises a fixed portion and a movable portion, and the movable portion is facing the second end of the plurality of elongated connection elements. The fixed portion of the at least one mechanical actuator is here preferably engaging with the second vessel portion. Such an implementation may potentially allow for an improved controllability of the clamping force between the first and the second vessel. However, it may in some other embodiments be desirable to turn the at least one mechanical actuator "upside down", such that the fixed portion is facing the second end of the plurality of elongated connection elements.

In a preferred embodiment of the present disclosure it may be desirable to configure the at least one mechanical actuator to include at least one hydraulic cylinder, whereby a source of energy for operating the hydraulic cylinder for example may include a hydraulic fluid pressure, or a pneumatic pressure. The use of a hydraulic cylinder is in many implementations useful since a hydraulic cylinder is easily controllable, cheap to manufacture, and provides for the possibility to exert an in comparison high level pressure as compared to other techniques used in relation to mechanical actuators. It should however be understood that the concept according to the present disclosure may be used with any form of mechanical actuator to achieve the desired effect of exerting the pressure between the second vessel portion and the second end of the plurality of elongated connection elements to clamp the first vessel portion to the second vessel portion. For example, it may be possible and within the scope of the present disclosure to make use of automatic as well as manually operated mechanical actuators. The mechanical actuator may further be controlled using other forms of energy, such as by means of an electric current.

It is generally advantageous to adapt the locking arrangement to comprises more than a single mechanical actuator, such as a plurality of mechanical actuators. It is furthermore desirable and preferred to ensure that the plurality of mechanical actuators are evenly positioned along a circumference of the second vessel portion. Using a plurality of mechanical actuators will also further increase the possibility of achieving an even distribution of the pressure exerted between the second vessel portion and the second end of the plurality of elongated connection elements to clamp the first vessel portion to the second vessel portion. Furthermore, a general advantage when including a plurality of mechanical actuators is the ability introduce an in comparison less powerful mechanical actuators as compared to using a single mechanical actuator. The plurality of less powerful mechanical actuators will further generally be less costly as compared to using one single more powerful mechanical actuator.

Furthermore, it may in some embodiments of the present disclosure be useful to adapt the locking arrangement such that each of the elongated connection elements at the second end is provided with a hinge engaging with the support structure. By the introduction of the hinge the elongated connection elements may be easily "moved away" from the locking flange, thereby simplifying a separation of the first vessel portion from the second vessel portion.

Still further, it may generally be advantageous, and in line with the discussion above, to arrange the plurality of elongated connection elements in such a manner that they are evenly positioned to engage with the locking flange of the first vessel portion. Again, such an implementation may be used for ensuring that the clamping force between the first and the second vessel portion is kept as even as possible throughout the interconnection area between the first and the second vessel portion.

The locking arrangement as discussed above is preferably provided as a component of a destruction system, further comprising a first vessel portion and a second vessel portion. Further features provided in relation to a specific type of destruction system will be given below. It should however be understood that the locking arrangement according to the present disclosure may be used with different types of destruction systems, i.e. not just the type of destruction as presented below.

Thus, according to a second aspect of the present disclosure there is provided a detonation-proof destruction system adapted for hazardous material destruction, wherein destruction system comprises a first vessel portion, a second vessel portion, and a locking arrangement arranged to, in operation, clamp the first vessel portion to the second vessel portion, wherein the first vessel portion and the second vessel portion are adapted to form a cavity therebetween at an interconnection area provided along a circumference of the first and the second vessel portion, and the destruction system further comprising a sealing arrangement provided for reducing the passage of fluids at the interconnection area, the sealing arrangement comprising a pressure reducing device fluidly connected to the cavity and arranged to, in operation, form a negative pressure within the cavity.

By means of the destruction system according to the second aspect of the present disclosure it is made possible to reduce the risk of an unwanted leakage out from the destruction system in relation to an operation of the destruction system, where dangerous material, including detonation-dangerous material is to be destructed. The destruction system according to the second aspect of the present disclosure is thus specifically useful in relation to destruction of dangerous material that could and/or will generate a dangerous gas emission when the material is destructed. Such hazardous or dangerous material to be destructed could for example include munitions comprising a gas component, such as including but not limited to a nerve gas component.

In accordance to the second aspect of the present disclosure this is achieve by the introduction of the novel sealing arrangement, where the sealing arrangement functions as a "barrier" for any substances/gases wanting to escape out from the closed vessel and out into an environment surrounding the destruction system. As indicated above, the cavity formed in relation to the interconnection area is fluidly connected to a pressure reducing device, such as a negative pressure pump, where the negative pressure pump as such is arranged to "expel" any gases present within the cavity. The gasses may then be handled in the most suitable manner, using e.g. a filtering device connected to the negative pressure pump. The gasses will thus have to pass the filtering device before being emitted into the atmosphere. That is, the sealing arrangement provided in relation to the present disclosure has the advantage of ensuring that any gases formed within the closed vessel and not being completely destructed within the closed vessel may be taken care of in a highly controlled manner, with a reduced risk of any of such gasses escaping in an unwanted manner (such as where the first vessel portion meets the second vessel portion.

To further reduce the risk of any unwanted escaping gasses (or smaller particles), it may in some embodiments be suitable to arrange the sealing arrangement to further comprising a first and a second sealing member, where the first and the second sealing member are radially separated at respective sides of the cavity. Accordingly, the first and the second sealing member will generally extend around the circumference of the vessel portions, thereby generally sealing the cavity from any gasses (or similar) leaking into the cavity (from inside of the closed vessel) as well as escaping out from the closed vessel (into the surrounding atmosphere.

In accordance to the present disclosure it is possible to position the first as well as the second sealing member "away" from the area closest to the inside of the closed vessel. That is, rather than trying to arrange the first sealing member directly at a position where, as seen from an inside of the closed vessel, the first vessel portion meets the second vessel portion, it is rather desirable to allow the first sealing member to be positions slightly further away towards an outside of the closed vessel. By this separated positioning, the first sealing member will be in less direct contact with any heat formed within the closed vessel. This also allows the first sealing member to be less affected by the heat within the closed vessel, resulting in a longer lifetime of the first sealing member.

In some embodiments the first as well as possibly the second sealing member may be selected to be made from e.g. graphite or carbon, where such materials are adapted to handle the in comparison high temperatures needed to safely destruct e.g. some dangerous gases. Such materials may however possibly be prone to some leakage, but this is in line with the present disclosure handled by means of the sealing arrangement. In some embodiments it is possible to form the first and the second sealing member as a graphite or carbon ring.

Another advantage following the use of the present sealing arrangement is the possibility to not having to rely on elastomer seals, as is common for prior art destruction systems. Such elastomer seals typically cannot withstand temperatures exceeding 250 degrees C., being well below normal operation temperatures for the destruction system. Effectively, a "broken" elastomer seal will result in a stop in operation of the destruction system.

It should be understood that it is desirable as well as suitable to make use of the above discussed locking arrangement for ensuring that a suitable clamping force is provided between the first and the second vessel portion, such that the cavity is sufficiently sealed, possibly in combination with the first and the second sealing member. That said, there are other ways of achieving a similar clamping force between the first and the second vessel portion, such as by means of introducing a plurality of manually operated pressure vessel clamps or manway clamps. Such clamps may achieve the desired clamping pressure, but will generally be less easy to operate, specifically if dangerous material is to be destructed. That is, the locking arrangement as discussed above in relation to the first aspect of the present disclosure will be easier to operate, preferably in non-manual manner thus reducing the risks involved with operating the destruction system.

Similarly, the sealing arrangement as has just been discussed above in relation to the second aspect of the present disclosure may advantageously be combined with the locking arrangement according to the first aspect of the present disclosure. However, this is not a must and the sealing arrangement as has just been discussed above in relation to the second aspect of the present disclosure may be used in relation to other types of closed vessels, not necessarily formed as discussed above.

For each of the destruction systems as presented above it is desirable to include a heating element, preferably arranged in relation to the first vessel portion. The heating element will, once operated, function to heat the dangerous material (s) arranged within the closed vessel for destructing the dangerous material(s). The temperature within the closed vessel is preferably between 200-800 degrees C.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Figure 1:
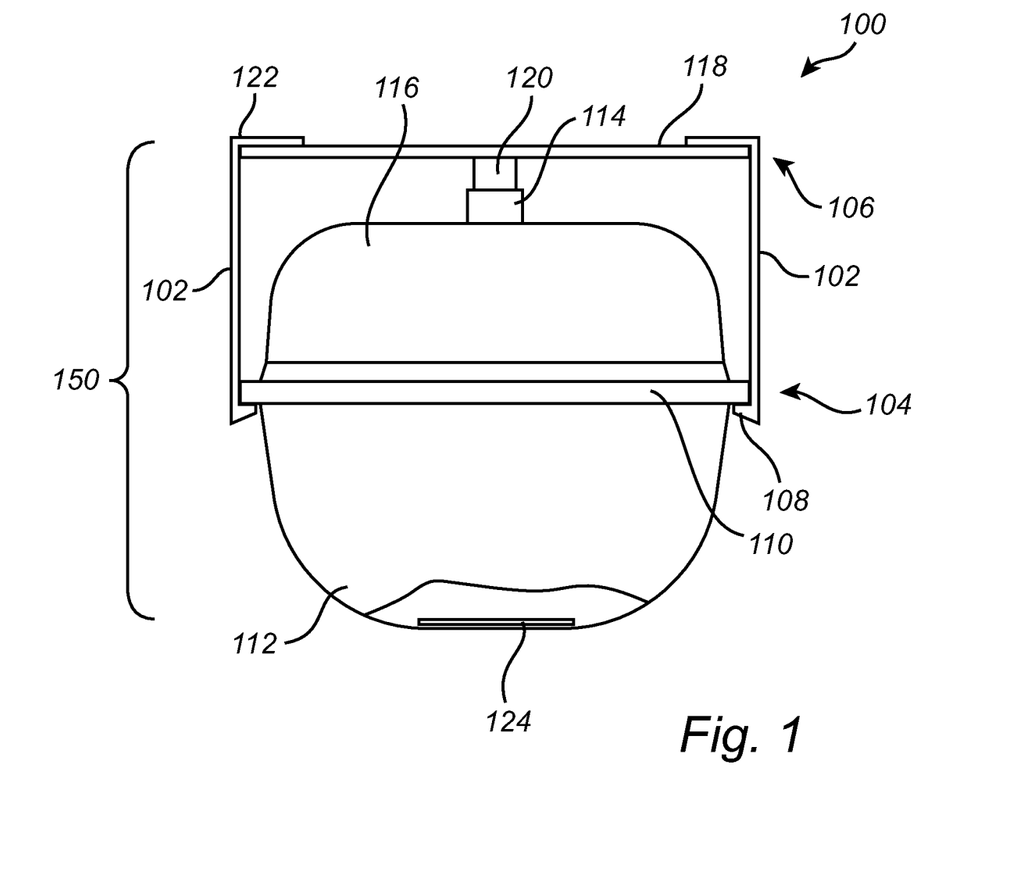
FIG. 1 conceptually illustrates a locking arrangement according to a currently preferred embodiment provided in relation to a destruction system.

Referring now to the drawings, where FIG. 1 conceptually illustrates a locking arrangement 100 according to a currently preferred embodiment, provided in the illustration as a component of a destruction system 150. The locking arrangement 100 comprises a plurality of elongated connection elements 102, in FIG. 1 shown as including two elongated connection elements 102, however it may of course be possible and within the scope of the present disclosure to include more than just two elongated connection elements 102.

Each of the elongated connection elements 102 are defined to have a first end 104 and a second end 106. The first end 104 is, as shown in FIG. 1, provide with a hook portion 108 adapted to engage with a locking flange 110 provided at a circumference of a first vessel portion 112.

The locking arrangement 100 further comprises a mechanical actuator 114 arranged be on one end engaging with a second vessel portion 116. As presented in FIG. 1, the mechanical actuator 114 is specifically shown to be arranged between the outer surface of the second vessel portion 116 and a support structure 118. The support structure 118 is in turn arranged to engage with the second end 106 of the elongated connection elements 102.

As such, during of the mechanical actuator 114, a movable portion 120 of the mechanical actuator 114 is to "push" towards the support structure 118, whereby the support structure 118 in turn will push at the second end 106 of the elongated connection elements 102. The hook portion 108 at the first end 104 of the elongated connection elements 102 will then in turn engage with the locking flange 110 of the first vessel portion 112, thereby "pulling" the first vessel portion 112 towards the second vessel portion 116. The pulling of the first vessel portion 112 towards the second vessel portion 116 will ensure that the first vessel portion 112 is "clamped" to the second vessel portion 116 at an interconnection area 122 provided along a circumference of the first vessel portion 112 and the second vessel portion 116, thereby forming a closed container.

Preferably, the elongated connection elements 102 are provided with a hinge 122, allowing the hook portion 108 to be "moved away" from the locking flange 110, thereby making it possible to move the first vessel portion 112 away from the second vessel portion 116. Moving away the first vessel portion 112 from the second vessel portion 116 allows for the first vessel portion 112 to be filled with dangerous material as well as for emptying the first vessel portion 112 once the dangerous material has been destroyed.

Furthermore, in a preferred embodiment the first vessel portion 112 further comprises a heating element 124, preferably electrically operated to heat the dangerous material within the closed container to thereby destruct the dangerous material.

In FIG. 1 there only illustrated a single mechanical actuator 114 and only two elongated connection elements 102. However, and as will be apparent from the below, the locking arrangement may in some preferred embodiment comprise a plurality of mechanical actuators 114 and an equal plurality of elongated connection elements 102.

Figure 2A:
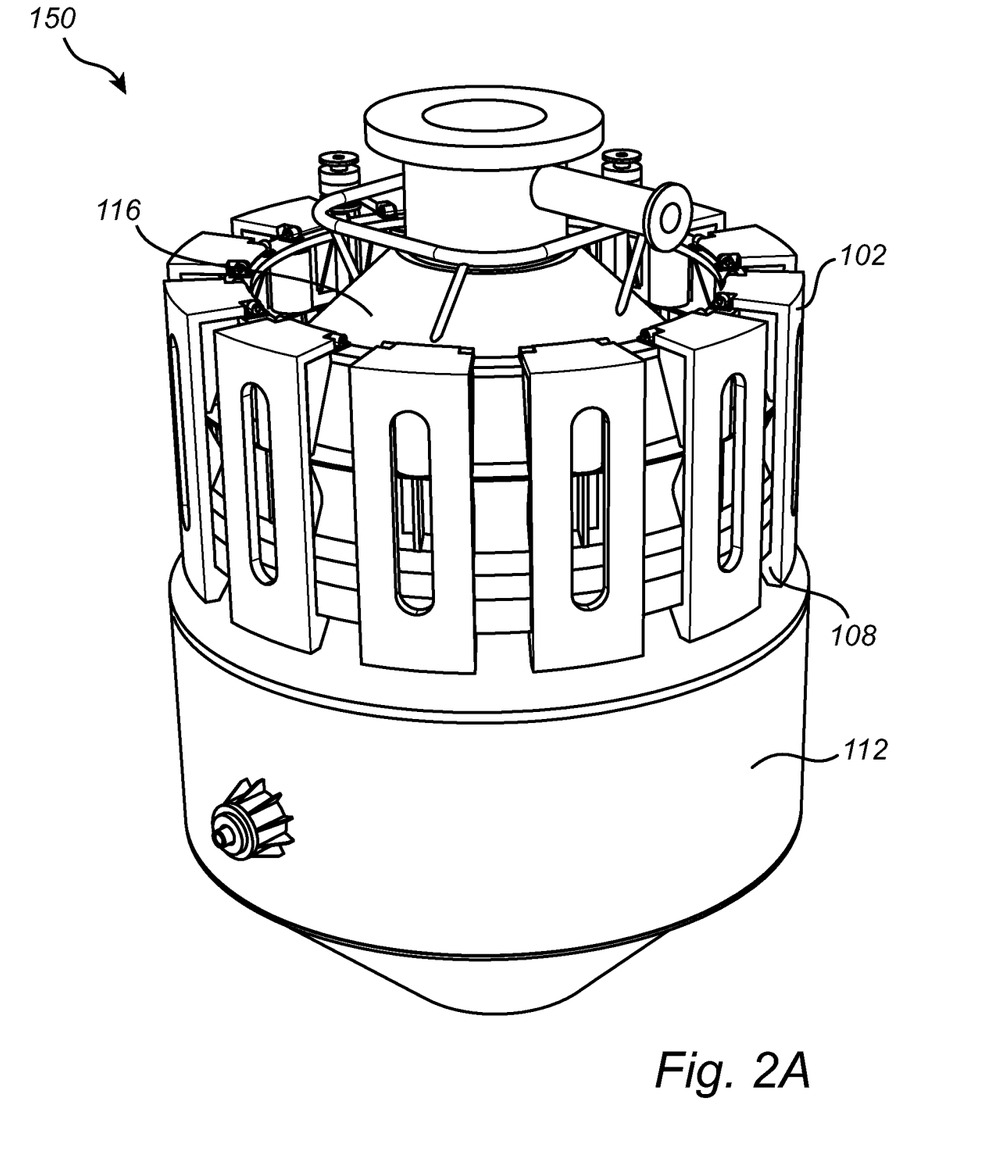
FIGS. 2A-2D presents a detailed illustration of a destruction system according to the present disclosure during its operation.
Figure 2B:
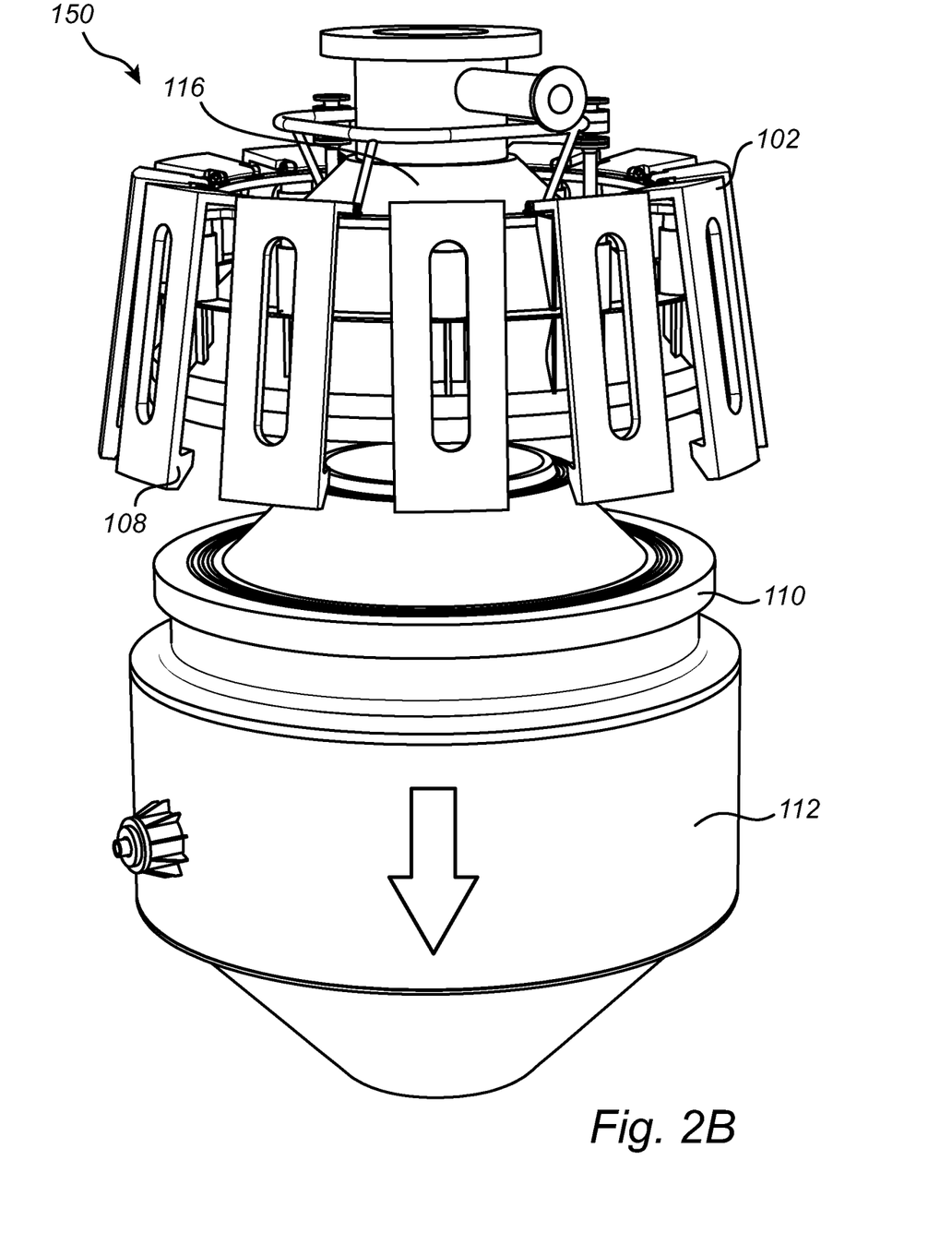
Figure 2C:
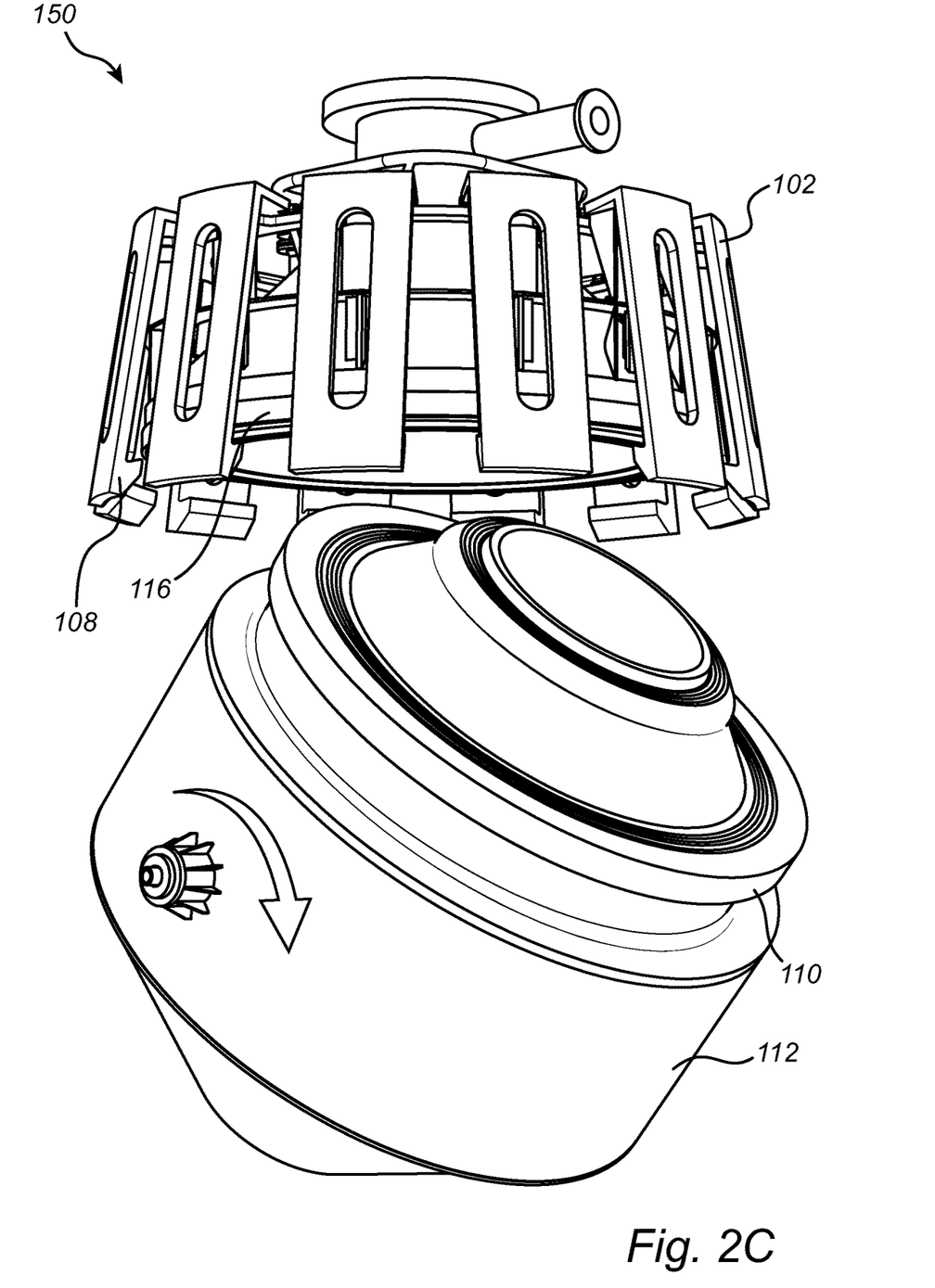
Figure 2D:
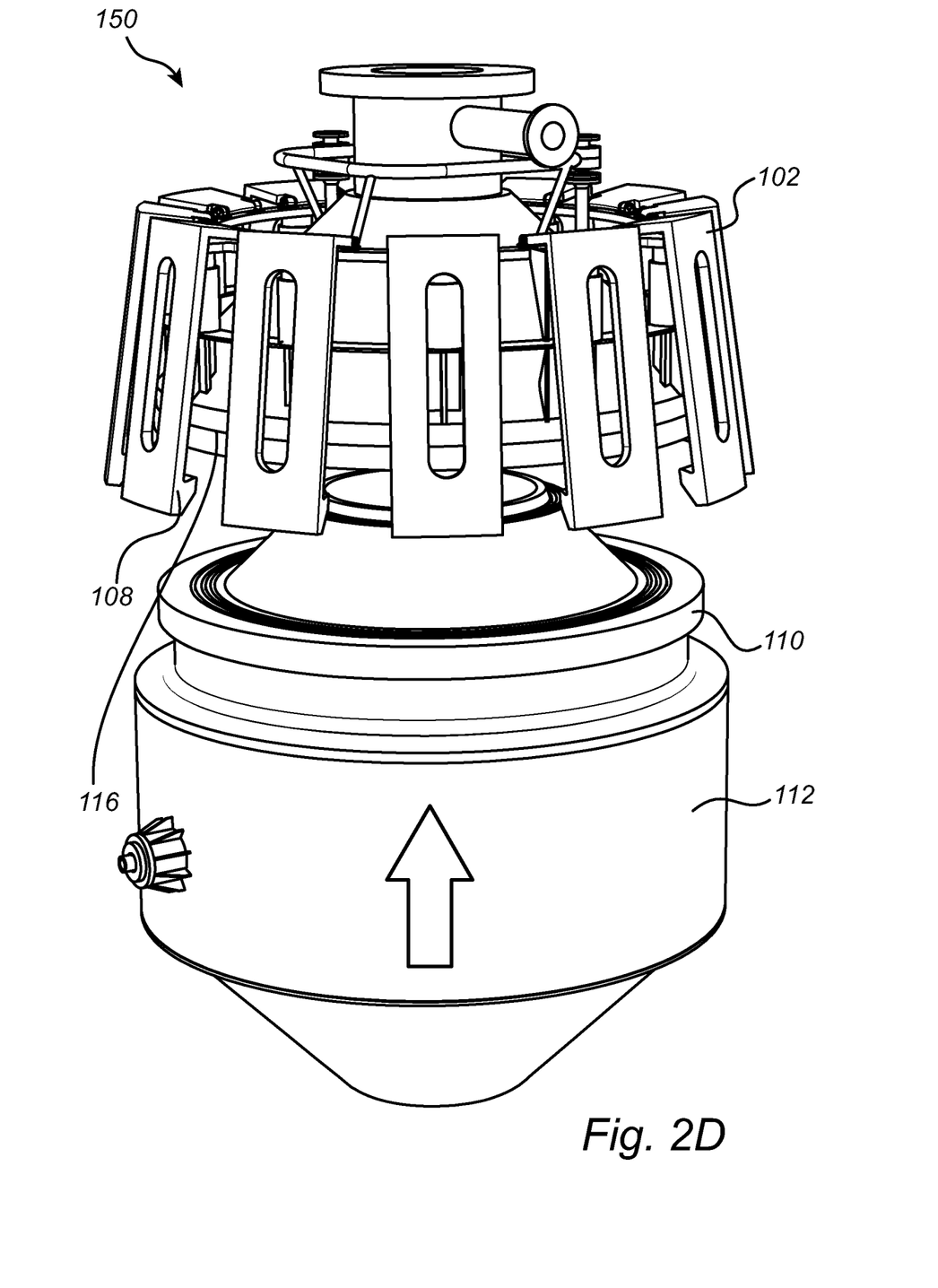

Turning now to FIGS. 2A-2D, presenting a detailed illustration of the destruction system 150 during its operation, starting from a locked state in FIG. 2A and transitioning to an emptying state as shown in FIG. 2D.

FIG. 2A shows a currently preferred embodiment of the destruction system 150. As seen, the locking arrangement 100 comprises in this embodiment a plurality of elongated connection elements 102 evenly positioned along a circumference of the second vessel portion 116. Each of the elongated connection elements 102 are in FIG. 2A shown to engage with the locking flange 110 of the first vessel portion 112. Accordingly, each of the plurality of mechanical actuators 114 are in FIG. 2 in their extended state, whereby the first vessel portion 112 is clamped to the second vessel portion 116.

In FIG. 2B the mechanical actuators 114 are retracted, whereby the clamping force is removed. As such, it is possible to reposition the elongated connection elements 102 away from the locking flange 110. The repositioning may possibly be performed by implementing electrically or hydraulically controlled hinges 122. The repositioning of the hinges 122 may also be performed by repositioning the closed vessel in relation to the locking arrangement 100, for example by equipping the elongated connection elements 102 with extensions sliding at an outer surface of the second vessel portion 116.

Once the elongated connection elements 102 have been repositioned the first vessel portion 112 may be moved away from the second vessel portion 116, for example by lowering the first vessel portion 112 (or by lifting the second vessel portion 116). When the vessel portions 112, 116 have been moved away from each other with a predetermined distance it may be possible to, as shown in FIG. 2C, rotate the first vessel 112 (while preferably keeping the second vessel portion still) around an axis 130. When the first vessel portion 112 has been rotated a predefined angle, such as for example between 45-90 degrees, the inside of the first vessel portion 112 may be easily accessed for loading the first vessel portion 112 with the dangerous material to be destructed.

However, as the destruction has been concluded it is desirable to remove any remaining debris (such as scrap metal). The first vessel portion 112 is thus rotated 118 degrees such that the opening of the first vessel portion 112 is facing completely downwards, as shown in FIG. 2D.

Figure 3:
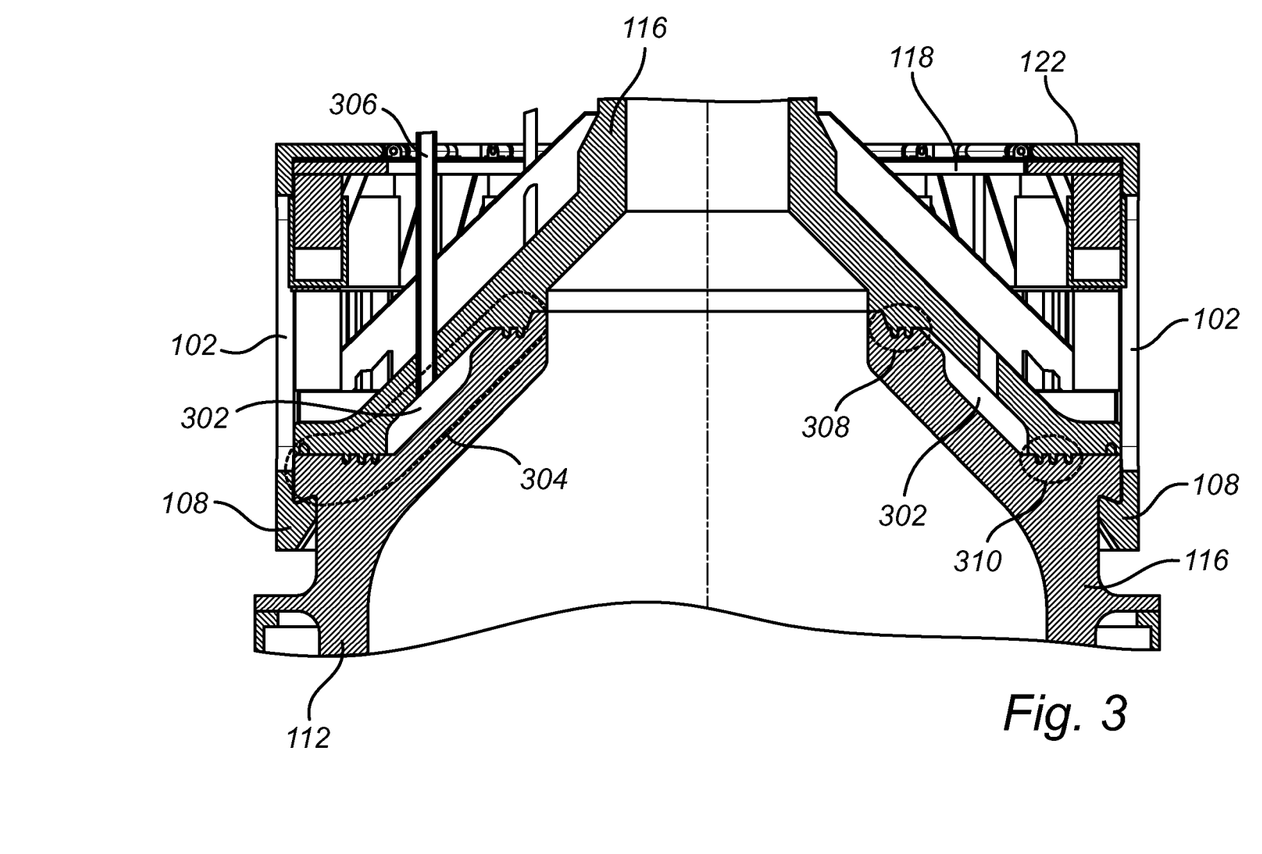
FIG. 3 shows a detailed cross section of a closed vessel of the destruction system.

Turning finally to FIG. 3, presenting a cross section of the closed vessel of the destruction system 150. The illustration provided in FIG. 3 is specifically directed to the interface formed between the first vessel portion 112 and the second vessel portion 116. Specifically, as is shown the first 112 and the second 116 vessel portions are configured such that a cavity 302 is formed therebetween at an interconnection area 304 provided along a circumference of the first 112 and the second 116 vessel portion. The first 112 and the second 116 vessel portions are thus having an extended an interconnection area 304 as compared to general prior-art implementations where vessel portions only have a "connection point" being smaller as compared to the presented interconnection area 304.

The destruction system 150 further comprises a sealing arrangement provided for reducing the passage of fluids at the interconnection area 304, where the sealing arrangement comprising a pressure reducing device (such as a pump, not shown) fluidly connected using a conduit 306 to the cavity 302 and arranged to, in operation, form a negative pressure within the cavity 302. In the illustration provided in FIG. 3 only a single cavity 302 is formed within the interconnection area 304. It could alternatively be possible to include more than a single cavity, if desired from an implementation perspective.

The sealing arrangement also comprising a first 308 and a second 310 sealing member, the first 308 and the second 310 sealing member being radially separated at respective sides of the cavity 302. The sealing members 308 and 310 are preferably selected from a material that can withstand the temperatures needed to destruct hazardous material or any form of munitions provided within the destruction system 150. In one embodiment the sealing members 308 and 310 are selected from a graphite or carbon, material. As shown in FIG. 3, it could be possible to include for example a plurality of graphite or carbon ring as the sealing members 308/310. In one embodiment three rings are provided at each side of the cavity 302.

In summary, the present disclosure relates to a locking arrangement for a destruction system comprising a first vessel portion and a second vessel portion, the locking arrangement provided for interconnecting the first vessel portion to the second vessel portion when facing each other, wherein the locking arrangement comprises a plurality of elongated connection elements having a first end and a second end, wherein each of the plurality of elongated connection elements at the first end is provided with an engagement portion adapted to engage with a locking flange provided at a circumference of the first vessel portion, and at least one mechanical actuator arranged between the second vessel portion and the second end of the plurality of elongated connection elements, wherein the at least one mechanical actuator is adapted to exert a pressure between the second vessel portion and the second end of the plurality of elongated connection elements to clamp the first vessel portion to the second vessel portion.

An advantage following the locking arrangement of the present disclosure is that the interconnection of the vessel portions can be made without the need for the prior art locking ring. The general use of a locking ring has shown highly reliable and has been positively accepted in the technical field of destruction systems. That said, to achieve the desired reliability, the locking ring has to be manufactured from a highly durable metal material to be able withstand a potential detonation within the closed vessel, thereby resulting in a destruction system that is complex as well as costly to manufacture, while also being less than easy to operate.

Although the figures may show a specific order of method steps, the order of the steps may differ from what is depicted. In addition, two or more steps may be performed concurrently or with partial concurrence. Such variation will depend on designer choice. All such variations are within the scope of the disclosure. Additionally, even though the present disclosure has been described with reference to specific exemplifying embodiments thereof, many different alterations, modifications and the like will become apparent for those skilled in the art. Variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A detonation-proof destruction system adapted for hazardous material destruction, the destruction system comprises:
   a first vessel portion,
   a second vessel portion, and
   a locking arrangement arranged to, in operation, clamp the first vessel portion to the second vessel portion,
wherein:
   the first vessel portion and the second vessel portion are adapted to form a cavity therebetween at an interconnection area provided along a circumference of the first and the second vessel portion, and
   the destruction system further comprising a sealing arrangement provided for reducing the passage of fluids at the interconnection area, the sealing arrangement comprising a pressure reducing device fluidly connected to the cavity and arranged to, in operation, form a negative pressure within the cavity,
   wherein the locking arrangement comprises:
      a plurality of elongated connection elements having a first end and a second end, wherein each of the plurality of elongated connection elements at the first end is provided with an engagement portion adapted to engage with a locking flange provided at a circumference of the first vessel portion, and
      at least one mechanical actuator arranged between the second vessel portion and the second end of the plurality of elongated connection elements, wherein the at least one mechanical actuator is adapted to exert a pressure between the second vessel portion and the second end of the plurality of elongated connection elements to clamp the first vessel portion to the second vessel portion.

2. The destruction system according to claim 1, wherein the locking arrangement further comprises:
   a support structure movably arranged in relation to the second vessel, wherein each of the plurality of elongated connection elements at the second end are engaging with the support structure.

3. The destruction system according to claim 1, wherein:
   the at least one mechanical actuator comprises a fixed portion and a movable portion, and
   the movable portion is facing the second end of the plurality of elongated connection elements.

4. The destruction system according to claim 3, wherein the fixed portion of the at least one mechanical actuator is engaging with the second vessel portion.

5. The destruction system according to claim 1, wherein the at least one mechanical actuator comprises a hydraulic cylinder.

6. The destruction system according to claim 1, comprising a plurality of mechanical actuators, wherein the plurality of mechanical actuators are evenly arranged along a circumference of the second vessel portion and between the second vessel portion and the second end of the plurality of elongated connection elements.

7. The destruction system according to claim 2, wherein each of the elongated connection elements at the second end is provided with a hinge engaging with the support structure.

8. The destruction system according to claim 1, wherein the plurality of elongated connection elements are evenly positioned to engage with the locking flange of the first vessel portion.

9. The destruction system according to claim 1, wherein the sealing arrangement further comprising a first and a second sealing member, the first and the second sealing member being radially separated at respective sides of the cavity.

10. The destruction system according to claim 1, wherein the first vessel portion further comprises a heating element.

11. The destruction system according to claim 1, wherein the at least one mechanical actuator is operable via a hydraulic fluid pressure or a pneumatic pressure.

12. The destruction system according to claim 1, further comprising a plurality of mechanical actuators positioned along a circumference of the second vessel portion.

13. The destruction system according to claim 1, wherein the at least one mechanical actuator is arranged to be manually or automatically controlled.

14. The destruction system according to claim 1, wherein the sealing arrangement comprises a plurality of sealing members formed as graphite or carbon rings.

15. The destruction system according to claim 1, wherein the sealing arrangement is positioned at a distance from an interior of the closed vessel to reduce direct heat exposure.

16. The destruction system according to claim 1, wherein the first vessel portion is configured to rotate around an axis.

\* \* \* \* \*